UNITED STATES PATENT OFFICE.

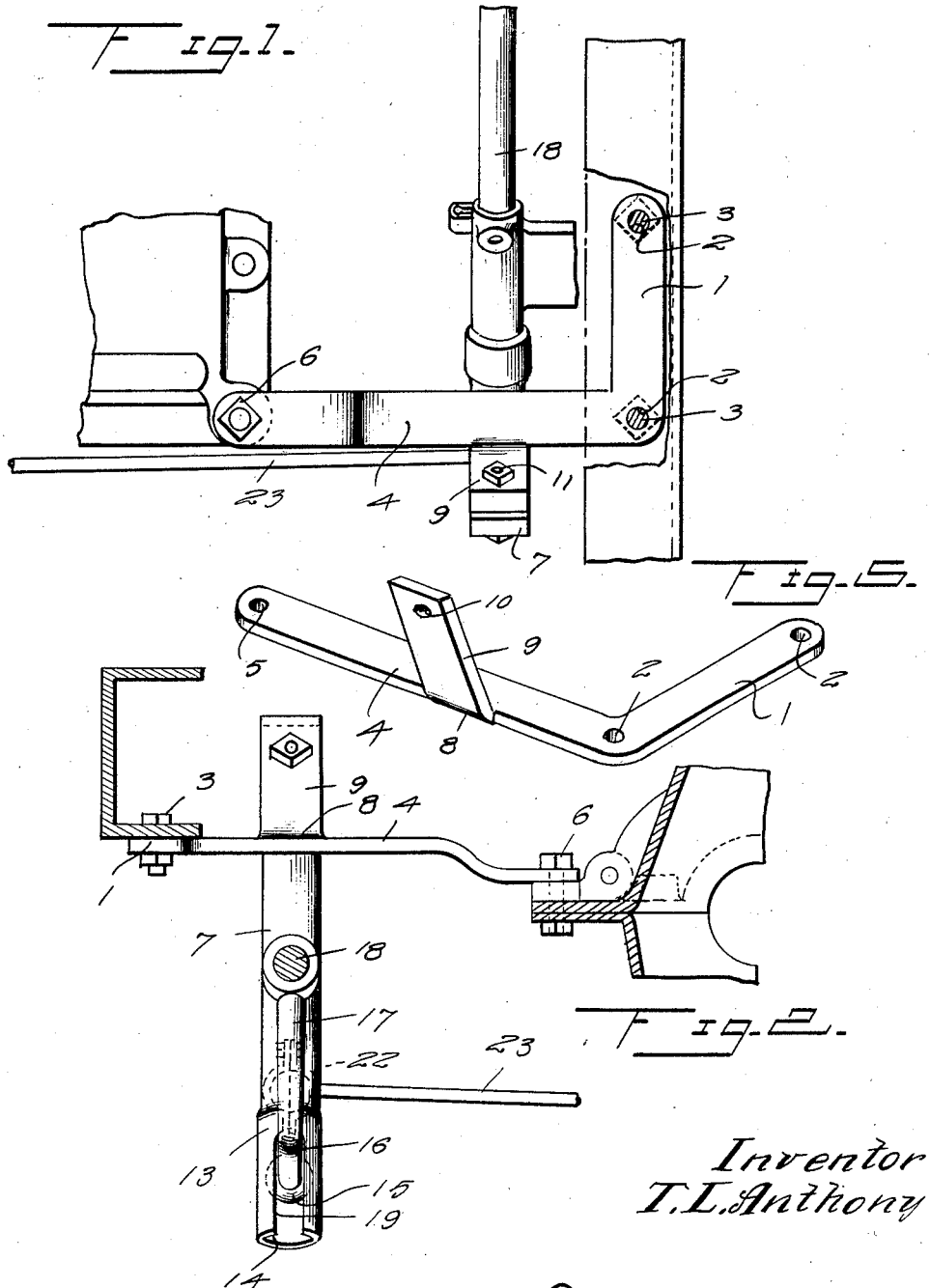

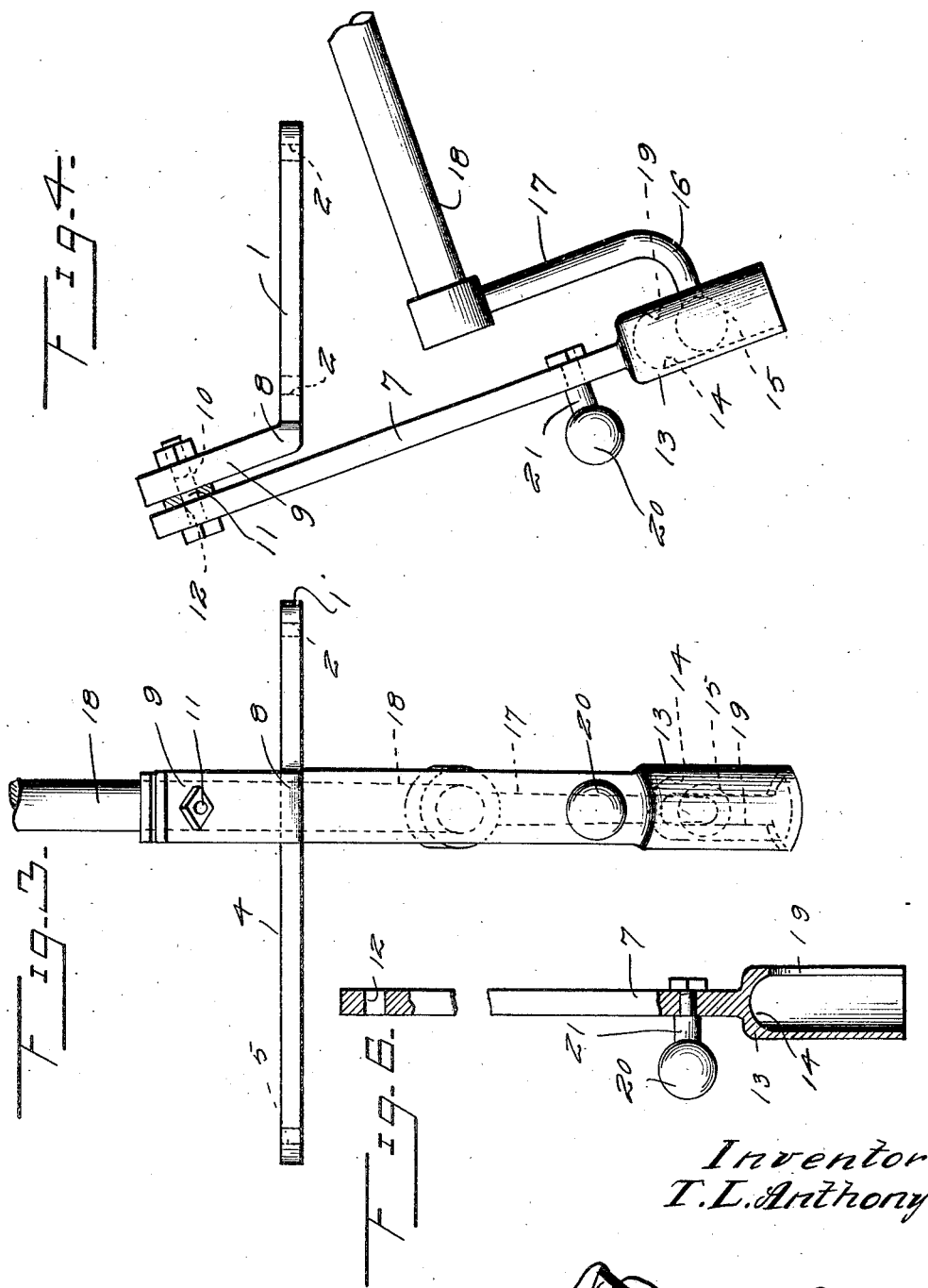

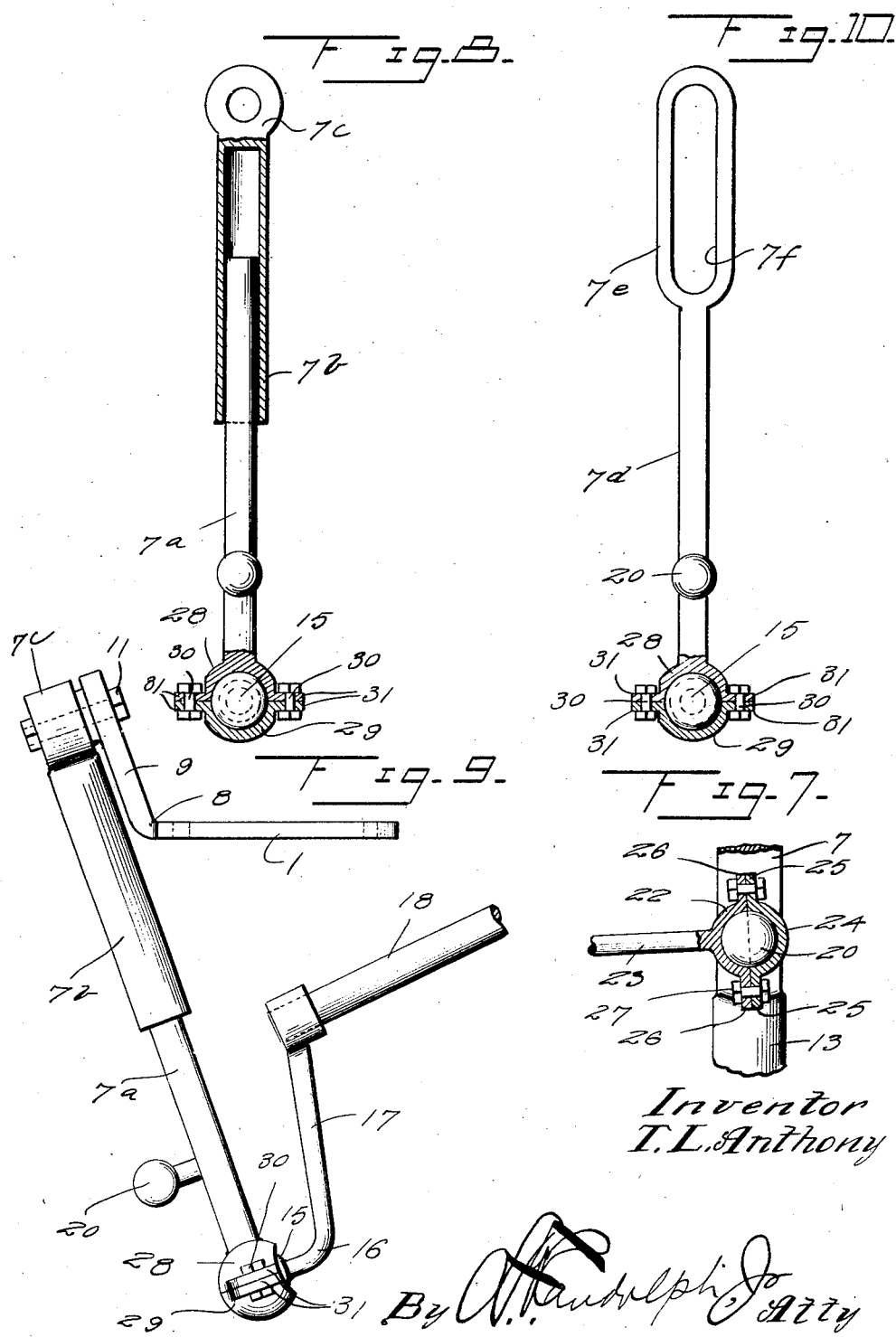

THOMAS L. ANTHONY, OF LINCOLN, NEBRASKA.

STEERING-GEAR CONNECTION FOR MOTOR-VEHICLES.

1,375,887.  Specification of Letters Patent.  Patented Apr. 26, 1921.

Application filed January 6, 1920. Serial No. 349,722.

*To all whom it may concern:*

Be it known that I, THOMAS L. ANTHONY, a citizen of the United States, residing at Lincoln, in the county of Lancaster and State of Nebraska, have invented certain new and useful Improvements in Steering-Gear Connections for Motor-Vehicles; and I do hereby declare the following to be a full, clear, and exact description of the invention, such as will enable others skilled in the art to which it appertains to make and use the same.

This invention relates to certain new and useful improvements in steering gear connections for motor vehicles and has for its primary object the provision of connections which will allow of free steering under all conditions and will assure positive and accurate operation of the steering wheels in response to the operation of the steering post.

Another object of the invention resides in the provision of steering gear connections of the above stated character which will be of simple construction and arrangement and which will be mounted upon the engine and frame of the vehicle so as to withstand the strain to which the parts of the connection will be subjected.

With these and other objects in view, the invention consists in the novel construction, combination and arrangement of parts as will be hereinafter specifically described, illustrated in the accompanying drawings and claimed.

In the accompanying drawings forming a part of this application and in which like reference characters designate corresponding parts throughout the several views, Figure 1 is a plan showing the steering gear connection in use, portions of the frame and engine of the motor vehicle and the steering rods being included in order to show the application of the invention, Fig. 2 is a rear elevation of the parts shown in Fig. 1, Fig. 3 is a detail front elevation thereof, Fig. 4 is a detail side elevation of the same, Fig. 5 is a detail view of the bracket member forming a part of the present invention, Fig. 6 is a detail view of the oscillating connecting arm, Fig. 7 is a detail sectional view showing the connection between the oscillating arm and the transverse rod of the steering mechanism, Fig. 8 is a detail view, partly in section, showing the modified form of the oscillating arm, Fig. 9 is a side elevation of the invention with the modified form of oscillating arm and the other parts constructed for this form of oscillating arm, and Fig. 10 is a detail elevation, partly in section, showing a further modification of the oscillating arm.

Referring more particularly to the drawings, 1 designates one arm of the angular bracket member which is provided with suitable apertures 2 to receive securing members 3 by which the bracket is mounted upon the frame of the motor vehicle. The arm 4 of the bracket, which extends at a right angle from the portion 1 thereof is also provided with an aperture 5 at its free end to receive a bolt for securing members 6 for engaging the bracket to the side of the engine, as will be readily understood by reference to the drawings.

To form a support for the oscillating connecting arm 7 the portion 4 of the bracket is provided with an extension which projects outwardly from the side thereof, as shown at 8, and then upwardly as shown at 9, the portion 9 being provided with a bolt opening 10 in which the supporting bolt 11 is mounted. The bolt 11 also extends through the upper end of the oscillating connecting arm 7, as shown at 11. The lower end of the arm 7 is enlarged to form the head 13 having the socket 14 formed therein and opening upon the lower end of the head 13 to receive a bolt 15 carried on the turned lower end 16 of the arm 17, which latter has its upper end mounted upon the lower extremity of the steering post 18. The longitudinal slot 19 is also provided in the head 13 and opens on the outer or lower end thereof to accommodate the turned lower end 16 of the arm 17, as shown in the drawings. Spherical member 20 is formed on the outer end of a neck 21 projecting from the side or front face of the oscillating connecting arm 7 near the head 13. The usual socket connection 22 may be readily secured upon the spherical member 20 to connect the oscillating arm 7 with the transverse rod 23 of the steering mechanism. The socket connection 22 is shown as being formed in two parts with the outer part 24 provided with outwardly directed ears 25 registering with the ears 26 of the main portion of the socket connection 22 and secured thereto by the bolts 27.

In Figs. 8 and 9 the modified form of oscillating connecting arm is disclosed. In this form the oscillating arm is constructed in two parts, the lower part $7^A$ being solid and having its upper end slidably engaged in the sleeve $7^B$, which carries a perforated ear $7^C$ upon its upper end for pivotal engagement upon the bolt 11 mounted in the upwardly extended portion 9 of the extension 8 of the supporting bracket. The spherical member 20 is carried by the lower section $7^A$ of the oscillating connecting arm and in place of the connection shown in the preferred form between the lower end of the oscillating connecting arm and the rigid steering arm 17, I have provided a semispherical member 28 upon the lower extremity of the section $7^A$ of the oscillating connecting arm. A semi-spherical socket member 29 may be secured to the semi-spherical member 28 by the bolts 30 or other suitable connecting members extended through parallel outwardly directed ears 31 of the members 28 and 29 so as to form a spherical socket for the wall or spherical member 15 of the rigid steering arm 17. It will therefore be seen that the sliding connection between the sections $7^A$ and $7^B$ of the oscillating connecting arm will permit the rigid steering arm 17 to describe an arc during operation of the device.

In the modification shown in Fig. 10 of the drawings the oscillating connecting arm $d$ is formed in one piece and provided with an enlarged or widened upper portion $7^E$ which has an elongated slot $7^F$ formed therein to receive the bolt 11, thereby providing for a vertical or longitudinal movement of the oscillating connecting arm during operation of the device. In this form of the invention the lower end of the connecting oscillating arm is constructed the same as in the modified form disclosed in Figs. 8 and 9 and therefore these parts are numbered accordingly and further detail description thereof is thought to be unnecessary.

From the foregoing, it will be seen that I have provided an oscillating member and mounting means therefor between the rigid steering arm 17 carried by the steering post 18 and the transverse rod 23 of the steering mechanism and while this connection is specially adapted to the Ford steering gear, it may be employed on various motor vehicles and therefore I do not wish to be limited to this specific construction and arrangement of parts as shown and described as many minor changes may be resorted to, providing such changes are within the scope of the appended claims.

What I claim is:—

1. The combination with the steering arm carried by the steering post of a motor vehicle and the main steering rod of the motor steering mechanism, of an oscillating arm having a head formed on its lower end and provided with a socket, the lower end of the steering arm being turned and having a ball formed thereon for movable engagement within said socket, means carried by said oscillating arm and said main steering rod to form a ball and socket connection therebetween, a supporting bracket for stationary engagement with the motor vehicle, and pivotal connections between said bracket and the upper end of said oscillating arm.

2. A steering gear connection for motor vehicles comprising the combination with the steering post and the steering arm carried by the steering post and having a turned free end, of a supporting bracket mounted on the vehicle and having an inclined portion, an oscillating arm pivotally mounted at its upper end on the inclined portion of the supporting bracket and having a downwardly opening socket formed in its enlarged lower end and provided with a slot in one side to receive the turned end of the arm carried by the steering post, and means carried by said oscillating arm to form connection between the same and the steering rods of the steering mechanism.

3. A steering gear connection for motor vehicles comprising the combination with the steering post and steering arms carried thereby and provided with a turned lower end with a ball formed thereon, and the steering rods of the steering mechanism, of an angular bracket secured to the vehicle provided with an upturned portion, of an operating arm pivotally mounted at its upper end upon the upturned portion of said supporting bracket and extended in an inclined plane at a right angle to the inclined plane of the steering post, said oscillating arm having an enlarged lower end formed into a downwardly opening elongated socket with a longitudinal slot in one side and opening upon the lower end thereof, the turned lower end of the arm carried by the steering post being extended through the slot and working in the socket of said oscillating arm, and a ball connection carried by the lower portion of said oscillating arm for connection with one of the steering rods.

In testimony whereof I affix my signature in presence of two witnesses.

THOMAS L. ANTHONY.

Witnesses:
BRUCE FULLERTON,
LYDIA FINKE.